United States Patent
Stevens

(10) Patent No.: US 9,941,693 B2
(45) Date of Patent: Apr. 10, 2018

(54) METHOD OF FORMING A BUS COUPLER AND STRUCTURE THEREFOR

(71) Applicant: SEMICONDUCTOR COMPONENTS INDUSTRIES, LLC, Phoenix, AZ (US)

(72) Inventor: Frederiek Ronald Stevens, Gavere (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 328 days.

(21) Appl. No.: 14/671,455

(22) Filed: Mar. 27, 2015

(65) Prior Publication Data

US 2015/0318694 A1    Nov. 5, 2015

Related U.S. Application Data

(60) Provisional application No. 61/986,104, filed on Apr. 30, 2014.

(51) Int. Cl.
*H02J 1/00* (2006.01)
*H04L 12/40* (2006.01)

(52) U.S. Cl.
CPC .......... *H02J 1/00* (2013.01); *H04L 12/40189* (2013.01); *Y10T 307/549* (2015.04)

(58) Field of Classification Search
CPC ....................................................... H02J 1/00
USPC .......................................................... 307/52
See application file for complete search history.

(56) References Cited

U.S. PATENT DOCUMENTS

| 5,194,692 | A | * | 3/1993 | Gallusser | ................. H01R 4/72 156/48 |
|---|---|---|---|---|---|
| 5,801,583 | A | | 9/1998 | Zierhut | |
| 6,172,515 | B1 | | 1/2001 | Zierhut | |
| 6,445,239 | B1 | | 9/2002 | Zierhut | |
| 2006/0186958 | A1 | | 8/2006 | Carreto et al. | |

FOREIGN PATENT DOCUMENTS

| EP | 0854587 | 7/1998 |
|---|---|---|
| EP | 1142080 | 10/2001 |
| EP | 1684457 | 7/2006 |

OTHER PUBLICATIONS

European Search Report for counterpart application No. EP 15165434, dated Aug. 28, 2015, 2 pages.
"Switched Bus Coupler with Embedded Equalization Pulse Generator," IP.com, IPCOM000182971D, May 11, 2009, 3 pages.

* cited by examiner

*Primary Examiner* — Joseph Chang
(74) *Attorney, Agent, or Firm* — Robert F. Hightower

(57) ABSTRACT

In one embodiment, a bus coupled includes a voltage control circuit configured to selectively conduct a current from the first current source away from an output of the coupler to regulate a voltage drop across the another current source to a first value. An embodiment of a method of forming a bus coupler may include configuring a circuit to store energy from the input into a first storage element in response to receiving an active portion of an input signal, and to transfer energy from the storage element to the output after termination of the active portion of the input signal.

20 Claims, 9 Drawing Sheets

US 9,941,693 B2

METHOD OF FORMING A BUS COUPLER AND STRUCTURE THEREFOR

PRIORITY CLAIM TO PRIOR PROVISIONAL FILING

This application claims priority to prior filed Provisional Application No. 61/986,104 entitled "DEVICES AND METHODS FOR HIGH EFFICIENCY BUS COUPLERS" filed on Apr. 30, 2014, and having common inventor Frederiek Ronald Stevens which is hereby incorporated herein by reference.

BACKGROUND OF THE INVENTION

The present invention relates, in general, to electronics, and more particularly, to semiconductors, structures thereof, and methods of forming semiconductor devices.

In the past, the semiconductor industry utilized various methods and structures to form bus coupler devices that were used to couple an electronic device to a bus. The bus could have various communication protocols and physical interfaces including multi-wire buses that transmitted data on one pair of wires and power on a different pair of wires. Some other buses, referred to as a two-wire bus, utilized one pair of wires to both transfer data and provide power. One example of a two-wire bus was often referred to as a KNX communication bus or KNX bus. The KNX bus has a defined communications protocol and various physical standards that had to be adhered to in order to be compatible with other devices that may be connected to the KNX bus. For example, in response to a change in a load that was connected to a KNX bus coupler, the bus coupler generally had to form a very slow change in the input current taken from the KNX bus by the bus coupler.

Some prior KNX bus couplers had larger than desired voltage drops between the KNX bus and the load connected to the bus coupler. In some applications, this led to consuming greater amounts of energy from the KNX bus than was desired. Some other prior KNX bus couplers could consume larger amounts of current from the KNX bus which could lead to an overload of the KNX bus. Some other prior art KNX bus couplers had an input impedance that was not accurately controlled, such as for example during active pulses on the KNX bus.

Accordingly, it is desirable to have a bus coupler that has a smaller voltage drop across the bus coupler, that more accurately controls the voltage drop across the bus coupler, that reduces the amount of energy consumed from the bus, or that more accurately controls the input impedance that is presented to the bus.

Figure 1:
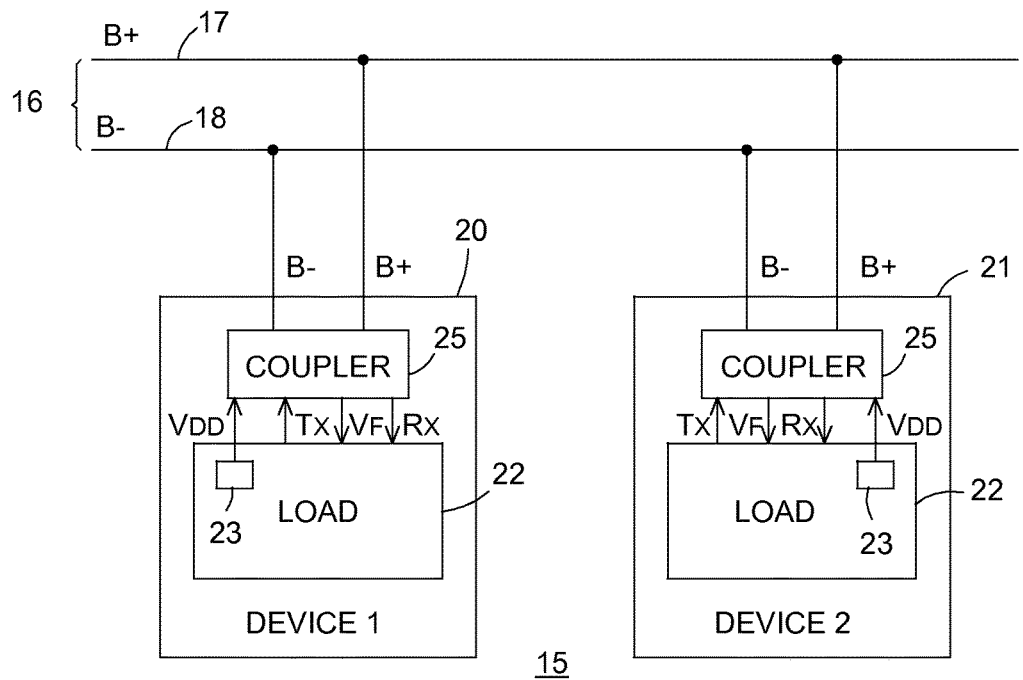
FIG. 1 schematically illustrates a block diagram of an example of an embodiment of a portion of a system that includes a bus coupler in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

DETAILED DESCRIPTION OF THE DRAWINGS

FIG. 1 schematically illustrates a block diagram of an example of an embodiment of a portion of a system 15 that utilizes a two-wire communication bus 16. In one example embodiment, bus 16 may be a KNX bus but may be other two-wire buses in other embodiments. An example embodiment of bus 16 includes a positive bus (B+) conductor 17 and a negative bus (B−) conductor 18. Conductor 17 may be more positive than conductor 18. A plurality of devices 20 are connected to bus 16 in order to provide communication between devices 20 or to other devices not illustrated in FIG. 1. In one example embodiment, each device 20 includes a bus coupler 25 and a load 22 that is connected to coupler 25. Coupler 25 is configured to minimize dampening of communication on bus 16 when coupler 25 is not transmitting signals on bus 16.

Load 22 typically provides a digital transmit signal (TX) to coupler 25 and coupler 25 transforms the digital TX signal into an electrical signal on bus 16 that adheres to the specifications of bus 16. Coupler 25 may receive a signal from bus 16 and transform the signal from bus 16 into a digital received signal (RX) that is provided to load 22. In some embodiments, coupler 25 may form an output voltage VF from bus 16. In an embodiment, coupler 25 may supply output voltage VF to load 22. Load 22 may also include a power supply 23 that supplies an operating voltage ($V_{DD}$) to supply operating power to operate portions of the circuitry of coupler 25. In other embodiments, supply 23 may be located in other places within device 20 or may be external to device 20.

Figure 2:
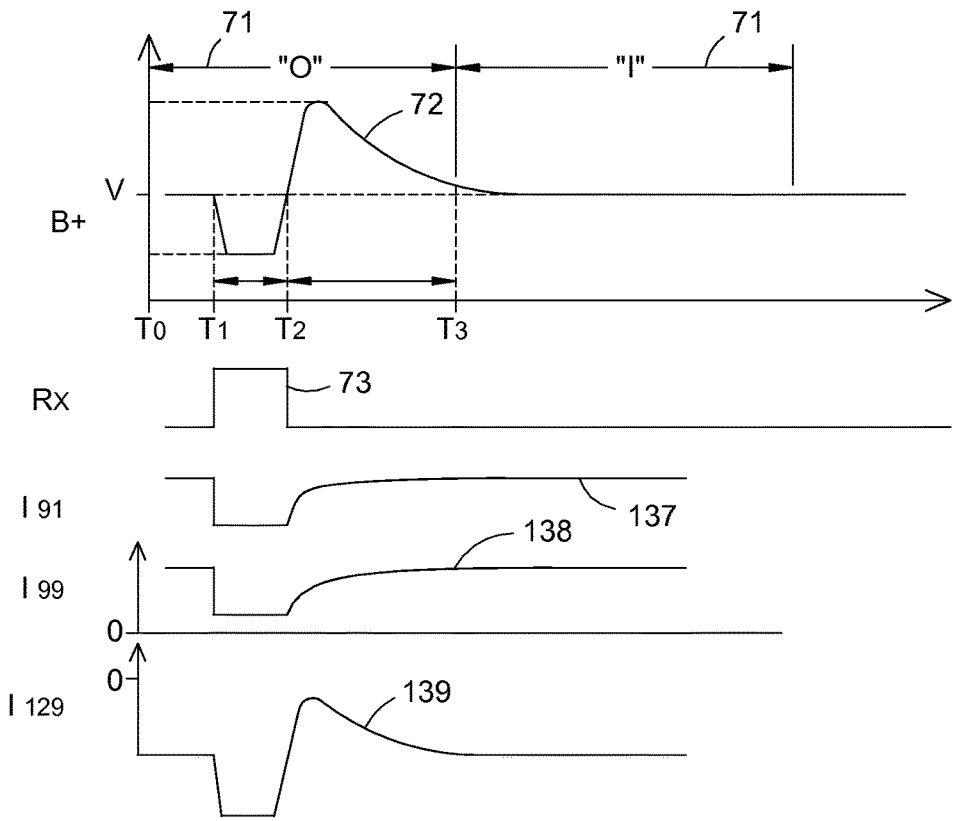
FIG. 2 is a graph having plots that illustrate some signals that may be formed during the operation of the bus coupler of FIG. 1 in accordance with the present invention.

FIG. 2 is a graph having plots that illustrate some of the signals that may be formed during the operation of coupler 25. The abscissa indicates time and the ordinate indicates increasing value of the illustrated signal. A plot 72 illustrates one example embodiment of the voltage of conductor 17 relative to conductor 18. A plot 73 illustrates one example embodiment of the received signal (RX) formed by coupler 25 in response to the signal illustrated by plot 72.

Plots 137, 138, and 139 illustrate example embodiments of other signals that may, in some embodiments, be formed by coupler 25. Plots 137, 138, and 139 will be explained further hereinafter.

For the example embodiment of bus 16 being a KNX bus, plot 72 illustrates an example of a logical "zero" on bus 16 during the time interval of one bit cell of information followed by at least a portion of a bit cell that includes a logical "1" formed on bus 16. The transmission of a bit of data is performed during a bit cell time interval illustrated by arrow 71. Under steady-state conditions, conductor 17 typically has a DC voltage level (V) relative to conductor 18 as illustrated by plot 72 at T0. The value of the DC voltage level (V) may have an embodiment that is in the range of approximately twenty-one volts (21V) to approximately thirty-two volts (32V). A logical "zero" is formed by decreasing the voltage level of conductor 17 in the first portion of the bit cell time interval as illustrated between times T1 to T2 of plot 72, and then allowing the voltage of conductor 17 to increase and allow transients to substantially dissipate by the end of the period of the bit cell as illustrated between times T2 to T3. The portion of the signal between times T1-T2 is referred as the active portion of the signal and the lower voltage of conductor 17 is referred to as an active pulse of the signal. An embodiment may include that the voltage level of conductor 17 relative to conductor 18 may return back to substantially the DC steady-state value prior to the expiration of the period of the bit cell as illustrated between times T2 to T3. Those skilled in the art will appreciate that the voltage level may not return back to exactly the steady-state value but returns to a value near the steady-state value. A logical "1" could be transmitted as substantially no change in the value of the steady-state DC voltage (V) during a bit cell time interval. Such operation is well-known to those skilled in the knowledge of the KNX bus.

Figure 3:
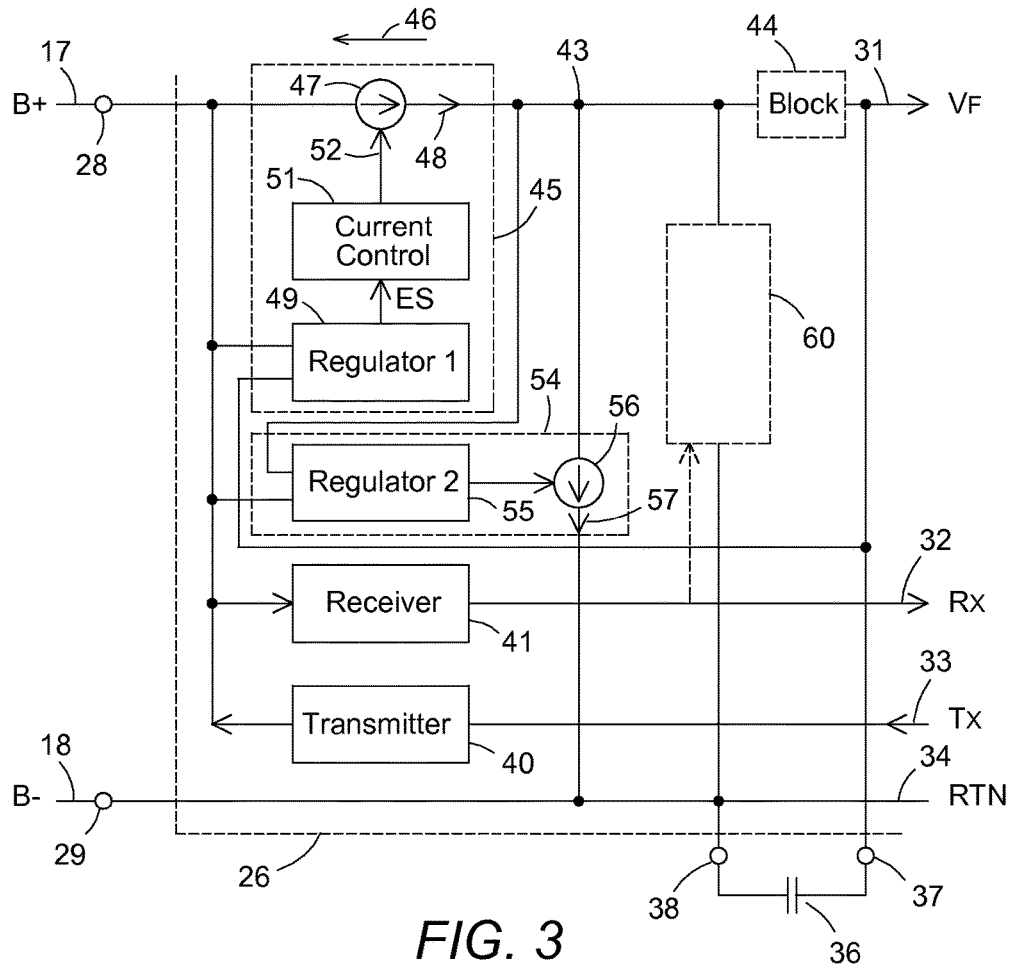
FIG. 3 schematically illustrates an example of an embodiment of a portion of a bus coupler that may be an alternate embodiment of the bus coupler of FIG. 1 in accordance with the present invention.

FIG. 3 schematically illustrates an example of an embodiment of a portion of a bus coupler 26 that may be an alternate embodiment of coupler 25 illustrated in FIG. 1. Coupler 26 has inputs 28 and 29 that are configured for coupling to bus 16. In one example embodiment, input 28 may be configured for coupling to conductor 17 of bus 16 and input 29 may be configured for coupling to conductor 18 of bus 16. Coupler 26 also includes an output 31 which is configured to provide the output voltage (VF). Output 31 is configured for coupling to an output capacitor 36 and to form the output voltage on capacitor 36. Capacitor 36 typically is connected between output 31 and return 34 to form a storage device for the output voltage (VF). In some embodiments, capacitor 36 may be external to coupler 26 and may be connected to output 31 via a terminal 37 and connected to return 34 via a terminal 38. In some embodiments terminal 38 may be omitted and capacitor 36 may be connected to input 29. An output 32 of coupler 26 is configured to provide received signal (RX) for transmitting to load 22. An input 33 is configured to receive digital transmit signal (TX) from a load coupled to coupler 26, such as for example load 22. A return (RTN) 34 of coupler 26 typically is configured to form a common reference voltage for the signals formed by coupler 26. In one example embodiment, return (RTN) 34 may be configured to be coupled to conductor 18 of bus 16. In some embodiments, return (RTN) 34 may be connected to a common ground reference.

In an embodiment, coupler 26 may include a receiver circuit 41 that is configured to receive signals from input 28 and form the digital received signal (RX) on output 32. Coupler 26 may also include, in an embodiment, a transmitter circuit 40 that is configured to receive the digital transmit signal (TX) from input 33 and to drive input 28 to form the transmitted signal on bus 16.

Coupler 26 includes a voltage control circuit 45 that is configured to form a current 48 and regulate a value of the output voltage (VF) formed on output 31. An embodiment of circuit 45 may include a regulated current source 47 that is configured to receive the signals from input 28 and form current 48 that is provided to output 31. Circuit 45 may also have an embodiment wherein circuit 45 is configured to control the value of current 48 to regulate the value of the output voltage (VF). An embodiment of current source 47 may be configured to regulate or vary the value of current 48 in response to values of a control signal 52. Circuit 45 may include an embodiment that may be configured to regulate the output voltage (VF) to a substantially constant value regardless of the voltage received on input 28 or in another embodiment to regulate the output voltage (VF) to a value that may vary according to the value of the voltage received on input 28. Another embodiment may include that the output voltage is regulated in a manner so that the output voltage (VF) tracks the value of the voltage received on input 28. In some embodiments, circuit 45 may also include a current control circuit 51 that controls the maximum rate of change per unit time of current 48 and/or in some embodiments may control the absolute maximum value of current 48.

In some embodiments, coupler 26 may include a blocking device or block 44 that prevents current from output voltage VF from flowing back into coupler 26. In an alternate optional embodiment, coupler 26 may also include an optional current switching circuit or bypass circuit 60 that may, under some conditions, shunt current from circuit 45 to return 34.

Coupler 26 also includes a second voltage control circuit 54. An embodiment of circuit 54 may be configured to regulate a voltage 46 that is formed across current source 47 to a value that maintains operation of source 47. Voltage 46 is illustrated in a general manner by an arrow. In one example embodiment, circuit 54 may be configured to control voltage 46 to a value that facilitates current source 47 operating as a controlled current source having a value that is controlled by control signal 52. An embodiment may include that circuit 54 is configured to control voltage 46 to a value that is no less than a threshold value that maintains source 47 operating to control the value of current 48 in response to the control signal received by source 47.

For a non-limiting example embodiment of source 47 including MOS transistors, if the value of voltage 46 decreased too much, the MOS transistors may begin operating as resistors instead of operating as MOS transistors. Thus, the value of current would then vary as the voltage across the current source changed instead of varying in response to the control signal received by the current source. Consequently, controlling the value of voltage 46 to a value no less than the threshold value of source 47 facilitates operating source 47 as the controlled current source having a current value that varies in response to a control signal received by source 47. An alternate embodiment may include that circuit 54 may be configured to control the value of voltage 46 to a threshold value that forms a high output impedance for source 47. Circuit 54 includes a regulator circuit 55 and a regulated current source 56 that forms a current 57. Regulator 55 is configured to receive voltage 46 and regulate the value of current 57 to keep the value of voltage 46 greater than the threshold value. In an embodiment, current 57 may be a portion of current 48.

Figure 4:
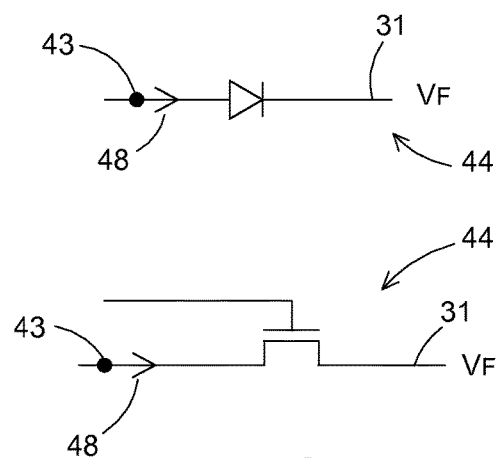
FIG. 4 schematically illustrates examples of devices that may be utilized for a blocking device or block of the bus coupler of FIG. 3 in accordance with the present invention.

FIG. 4 schematically illustrates examples of devices that may be utilized for blocking device or block 44. In one example embodiment, block 44 may be a diode connected between node 43 and output 31 such that current may flow from source 47 to output 31. Block 44 may have an alternate embodiment of a selectively enabled device, such as for example a transistor, that may be selectively enabled to allow current 48 to flow to output VF in response to a control signal. For embodiments that include circuit 60, block 44 may be connected between node 43 and circuit 60 or may be connected between circuit 60 and output 31 in another embodiment.

Figure 5:
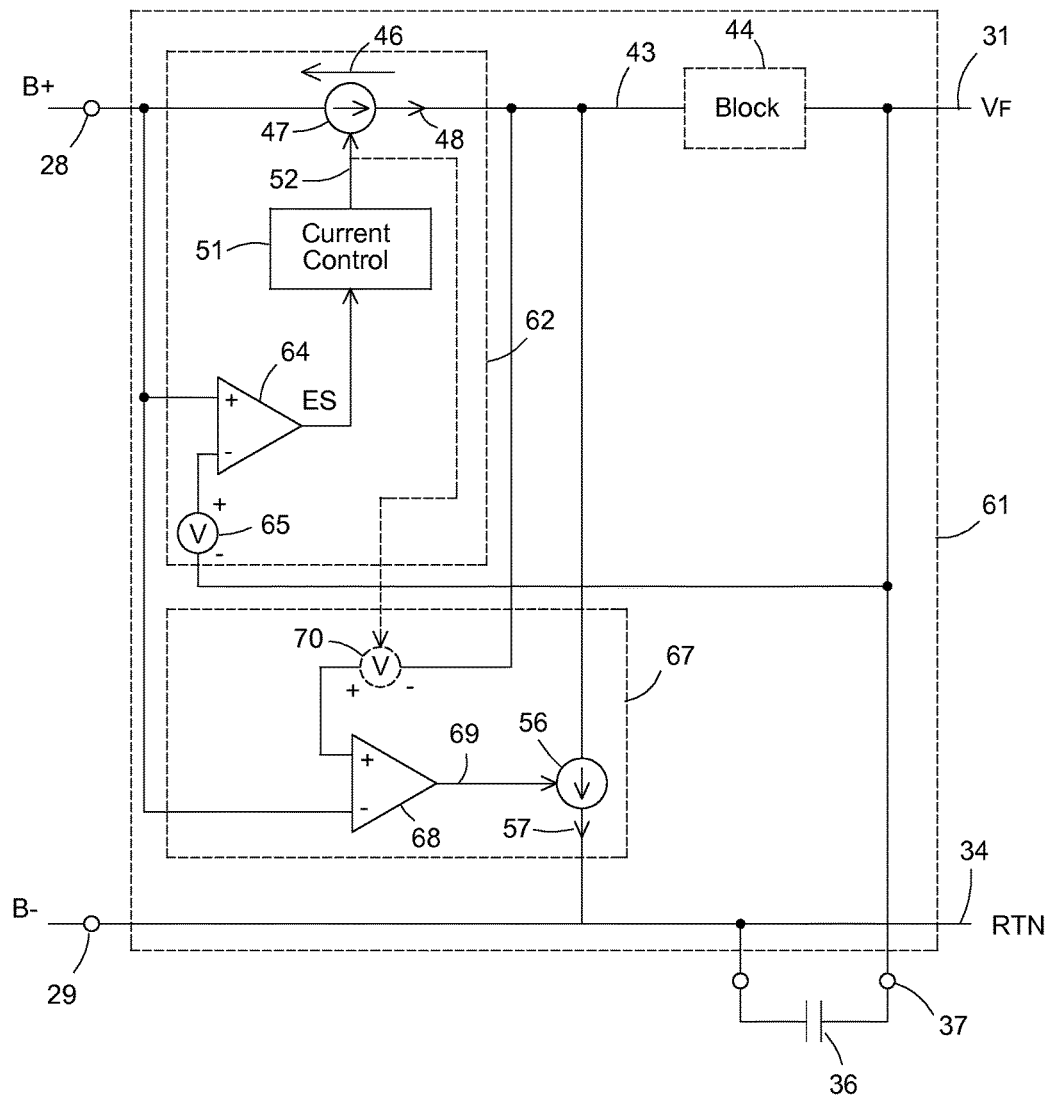
FIG. 5 schematically illustrates an example of an embodiment of a portion of a bus coupler that may be an alternate embodiment of the bus couplers of at least FIGS. 1 and 3 in accordance with the present invention.

FIG. 5 schematically illustrates an example of an embodiment of a portion of a bus coupler 61 that is an alternate embodiment of couplers 25 and 26. Coupler 61 is substantially similar to couplers 25 and 26 except that coupler 61 includes a voltage control circuit 62 that may be an alternate embodiment of circuit 45, and a voltage control circuit 67 that may be an alternate embodiment of circuit 54. Coupler 61 has an embodiment that does not include circuit 60 that was an optional circuit for coupler 26.

An embodiment of circuit 62 may include an amplifier 64 that is configured to form an error signal (ES) that is representative of a difference between the value of the voltage received from input 28 and the value of the output voltage (VF) on output 31. The error signal (ES) is utilized to regulate the value of the output voltage. Amplifier 64 is configured to receive the voltage from input 28 and the output voltage (VF) and form the error signal (ES). In some embodiments, circuit 62 may include an offset circuit 65 that forms an offset voltage to regulate the difference between the voltage on input 28 and output 31 to the value of the offset voltage of circuit 65. For example, the output voltage may be added to the offset voltage. The value of the offset voltage from circuit 65 may have an embodiment that represents a value of voltage 46 that facilitates normal operation of current source 47 as a variable current source, such as a current source that has a variable current value in response to a control signal. Circuit 67 may have an embodiment that includes an amplifier 68 and source 56. An embodiment of circuit 67 may also include a variable offset circuit 70 that provides a variable offset voltage. The variable offset circuit 70 is illustrated by dashed lines.

When a device transmits a logic "0" on bus 16, the value of the voltage on input 28 decreases. However, the value of the output voltage on output 31 may not decrease, thus, the value of voltage 46 across current source 47 may change which could affect the operation of source 47 or the value of current 48. For example, the value of input 28 may decrease to a voltage that may attempt to reduce voltage 46 to a value that is less than the threshold value of voltage 46. However, circuit 67 is configured to regulate the value of voltage 46 to a value that is no less than the threshold value for source 47. In an embodiment, amplifier 68 may form a control signal 69 to control the value of current 57 in response to the value of voltage 46 changing. In one non-limiting example embodiment, as the value of the voltage 46 decreases, circuit 67 increases the value of current 57. Increasing current 57 conducts a portion of current 48 through current source 56 and keeps voltage 46 at a value that is no less than the threshold value for source 47. An embodiment may include that circuit 67 may be configured to regulate the value of current 57 to maintain voltage 46 at a value that facilitates current source 47 operating as a current source. In another embodiment, circuit 67 may be configured to regulate the value of current 57 to maintain voltage 46 at a value that provides a high output impedance for source 47.

Another embodiment of circuit 67 may be configured to regulate the value of voltage 46 according to a value of current 48. An embodiment of circuit 67 may include optional offset circuit 70, illustrated in dashed lines, that has a voltage that varies according to the value of current 48. Circuit 70 may be configured to receive a control signal from circuit 62 that is representative of the value of current 48 to which source 47 is controlled to provide. The control signal can change the value of the offset voltage formed by offset circuit 70 so that circuit 67 regulates the value of voltage 46 according to a value of current 48. In an embodiment, the value of signal 52 may be representative of the value of current 48 that source 47 is controlled to form, thus, signal 52 may be used to control current 57 according to the value of current 48.

Those skilled in the art will appreciate that increasing the value of current 48 may mean that the value of voltage 46 should increase to support the increased current value, or vice versa. Circuit 67 is configured to increase the value of current 57 to keep the value of voltage 46 above the threshold value in response to the value of voltage 46 decreasing to such extent that the positive input terminal of amplifier 68 exceeds the negative terminal. Similarly, in response to current 48 increasing, circuit 67 is configured to increase the voltage of offset circuit 70. In response to the positive terminal of amplifier 68 exceeding the negative terminal (such as for example the output voltage VF increasing or the voltage on input 28 decreasing), circuit 67 is configured to increase the value of current 57 to keep the value of voltage 46 above the threshold value of source 47.

If the value of voltage 46 either remains constant or increases, circuit 67 is configured to either keep constant or decrease, respectively, the value of current 57. Circuit 67 is configured to either keep constant or decrease the value of current 57 in response to current 48 either having a constant value or decreased value, respectively. Circuit 67 is also configured to either keep constant or decrease the value of the voltage of offset circuit 70 in response to current 48 either having a constant value or decreased value, respectively.

Another optional embodiment may include that circuit 70 includes a threshold detecting circuit such that circuit 70 provides no voltage until the value of the control signal reaches a value that is representative of the threshold value of current 48.

In another embodiment, circuit 67 may be configured to regulate the value of voltage 46 according to a desired value of current 48 that circuit 62 is trying to achieve. In one embodiment, the error signal (ES) from amplifier 64 may be representative of the desired value of current 48. The error signal (ES) may be used as the control signal to control the value of the offset voltage formed by circuit 70 instead of using signal 52. Consequently, if the value of voltage 46 decreases to such extent that the positive input terminal of amplifier 68 exceeds the negative terminal, circuit 67 increases the value of current 57 to keep the value of voltage 46 above the threshold value of source 47. Similarly, if the current level in current source 47 increases, which causes the voltage of offset circuit 70 to increase, to such an extent that the positive terminal of amplifier 68 exceeds the negative terminal, circuit 67 increases the value of current 57 to keep the value of voltage 46 above the threshold value. When the value of voltage 46 remains constant or increases, circuit 67 will keep constant or decrease the value of current 57, respectively. When the current level in current source 47 remains constant or decreases, such that the voltage of offset circuit 70 remains constant or decreases respectively, circuit 67 will keep constant or decrease the value of current 57, respectively.

Regulating the value of voltage 46 to no less than the threshold value facilitates keeping the output impedance of source 47 high even at lower values of voltage 46 thereby reducing the power consumed from bus 16. In an embodiment, regulating the value of voltage 46 to no less than the threshold value allows configuring circuit 54 to form current 57 to have a substantially zero value in steady state conditions, such as for example the state of input 28 at substantially the steady-state DC voltage value (V). Also, regulating the value of voltage 46 to no less than the threshold value in an embodiment may facilitate maximizing energy transfer from input 28 to output 31 in steady state conditions. Because coupler 61 regulates the value of voltage 46, it is believed that coupler 61 may omit a current bypass circuit that is required in many prior bus couplers thereby reducing the cost for coupler 61. The regulated current path provided by circuit 67 allows larger transitions of the output voltage (VF) without reducing the output impedance of source 47. Additionally, it facilitates using a smaller value of capacitor 36 which provides a cost savings. Those skilled in the art will appreciate that amplifiers 64 and 68 may receive signals that are representative of the output voltage and/or the voltage on input 28 (or even representative of voltage 46) instead of receiving the voltages directly. For example, a voltage divider or other circuit may be used to reduce the value of the voltages to values that are more suitable for the inputs of amplifier 64. An alternate embodiment may include forming the output voltage (VF) at node 43 so that node 43 may replace output 31.

In order to provide the functionality described for coupler 61, a first terminal of current source 47 is commonly connected to input 28, a non-inverting input of amplifier 64, and an inverting input of amplifier 68. A second terminal of current source 47 is commonly connected to node 43, a first terminal of current source 56, and to output 31 (or alternately to an input of block 44), and to a non-inverting input of amplifier 68 (or alternately to a first input of circuit 70 which has a second input connected to the non-inverting input of amplifier 68). An output of amplifier 68 is connected to a control input of current source 56. A second terminal of current source 56 is connected to return 34. An inverting input of amplifier 64 is connected to receive the output voltage on output 31 or alternately on node 43. Alternately, the inverting input of amplifier 64 is connected to a first terminal of circuit 65 which has a second terminal connected to output 31 to receive the output voltage. An output of amplifier 64 is connected to an input of circuit 51 which has an output connected to a control input of current source 47. Alternately, the output of amplifier 64 may be connected to a control input of circuit 70.

Figure 6:
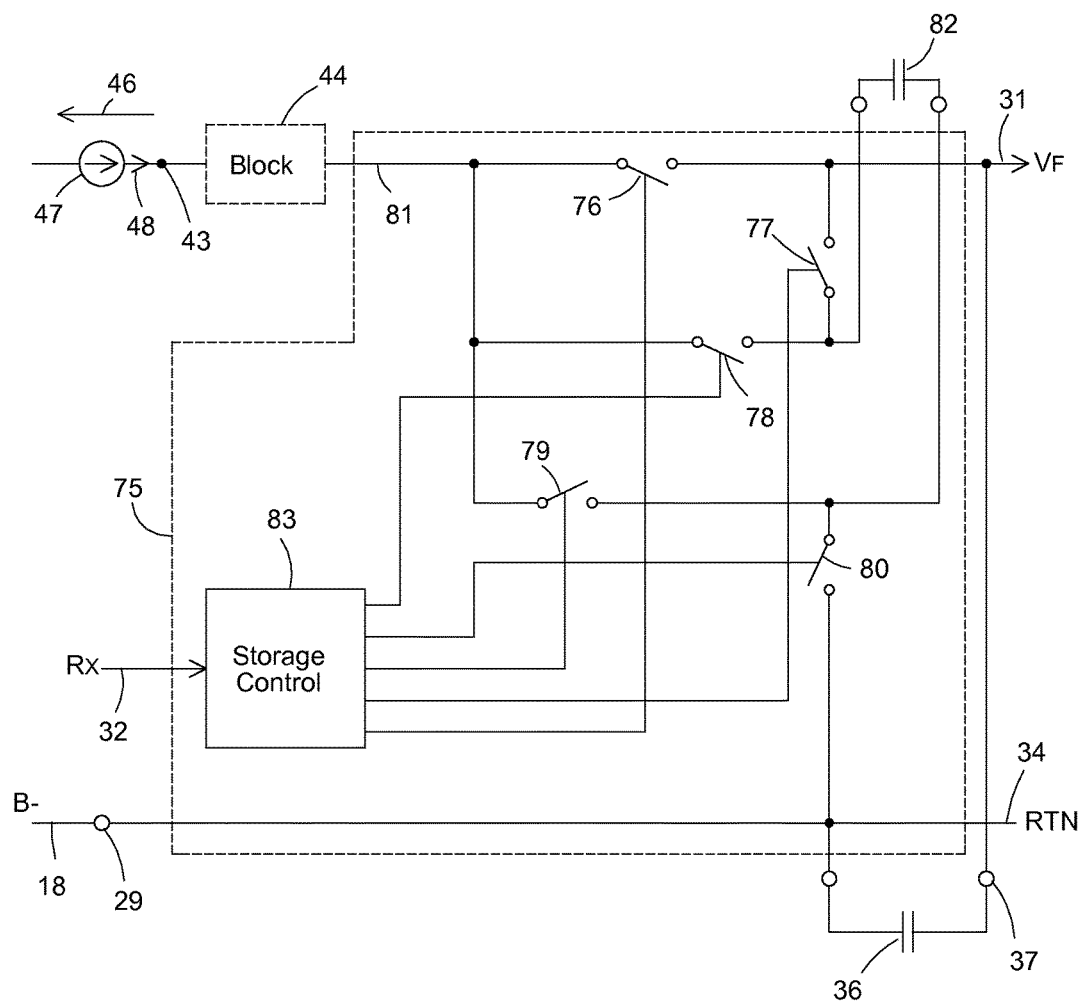
FIG. 6 schematically illustrates an example of an embodiment of a portion of a storage circuit that may be a portion of the bus couplers of at least FIGS. 1, 3, and 5 in accordance with the present invention.

FIG. 6 schematically illustrates an example of an embodiment of a portion of a storage circuit 75. An embodiment of circuit 75 is configured to store energy from current 48 in a storage element in response to receiving the active portion of a signal transmitted on bus 16 and to transfer energy from the storage element to output 31 after termination of the active portion of the input signal.

Circuit 75 includes a plurality of switches, for example switches 77-80 and an optional switch 76, a storage element, such as for example in one non-limiting embodiment a capacitor 82, and a storage control circuit 83. In steady-state operation with no signal applied to bus 16, circuit 75 substantially does not load current 48. For example, an embodiment circuit 75 may be configured to conduct current 48 to output 31. An embodiment may include that in response to the received signal (RX) having a negated state such that no signal active pulse is received from bus 16, circuit 83 may be configured to enable optional switch 76 and disables switches 77-80 to form a conduction path for current 48 to output 31. Those skilled in the art will appreciate that in the condition of switch 76 being closed or enabled, that may be some minor amount of current 48 dissipated in switch 76. In an optional embodiment, switch 76 may be omitted and circuit 83 may be configured to enable switches 77-78 and disable switches 79-80 to conduct current 48 to output 31.

Circuit 83 may include an embodiment in which capacitor 82 is coupled to store energy from current 48 in response to receiving the active portion of the received signal (RX). For example, circuit 83 may be configured to enable switches 78 and 80 and disable switches 76-77 and 79 in response to the active portion of the signal such that current 48 may flow to charge capacitor 82. After termination of the active portion, circuit 83 may enable switches 77 and 79 and disables switches 76, 78, and 80 to transfer energy to output 31. For example, connect capacitor 82 in series with current 48. An embodiment of circuit 75 may include that capacitor 82 may be charged in response to an active portion of one signal and that capacitor 82 may be connected to transfer energy to output 31 during the active portion of a subsequent signal. The subsequent signal may be an immediately following signal or may be a later occurring signal. Block 44 may be omitted for embodiments that include switch 76. For example, block 44 may be replaced by a conductor in some embodiments.

Figure 7:
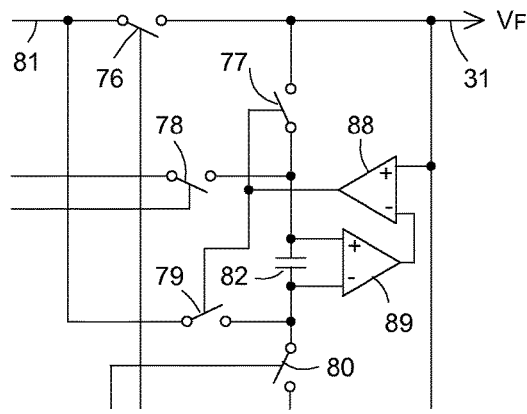
FIG. 7 schematically illustrates an example of another circuit that may be a portion of the bus couplers of at least FIGS. 1, 3, and 5 in accordance with the present invention.

Referring to FIG. 7 and FIG. 6, in an alternate embodiment, circuit 75 may be configured to transfer charge from capacitor 82 to output 31 in response to the voltage on capacitor 82 having a value that is greater than a threshold value. The threshold value typically is a value that is less than the value of the output voltage (VF). In an embodiment, the threshold voltage may be expressed as:

$$Vth = VF - V28 - VA + V46th + VD$$

where;
Vth=the threshold value of voltage on capacitor 82 that is sufficient to support a charge transfer,
VF=the output voltage,
V28=the d.c. value voltage from bus 16 on input 28,
VA=the amplitude of the active pulse above the d.c. value,
V46th=the threshold value of voltage 46 for operation of source 47 (in some embodiments, V46th may be substantially equal to voltage 70), and
VD=a delta voltage to provide a safety margin for the transfer.

For example, circuit 75 may include a circuit to detect the value of the voltage across capacitor 82 and compare that to the output voltage and enable switches 77 and 79 in response to the voltage on capacitor 82 being greater than a threshold value for initiating the transfer. The circuit to detect the value of the voltage across capacitor 82 may include an amplifier 89 and a comparator 88.

In order to implement the above described functionality for circuit 75, optional switch 76 may have a first terminal connected to output 31 and a second terminal connected to an input 81 of circuit 75. A first terminal of switch 77 is connected to output 31 and a second terminal is commonly connected to a first terminal of switch 78 and a first terminal of the storage element. A second terminal of switch 78 is connected to input 81. A first terminal of switch 79 is connected to input 81 and a second terminal is commonly connected to a second terminal of the storage element and a first terminal of switch 80. A second terminal of switch 80 is connected to return 34. A first control signal from circuit 83 is connected to a control terminal of switch 78, and a second control signal from circuit 83 is connected to a control input of switch 80. A third control signal from circuit 83 is connected to a control input of switch 79, the fourth control signal of circuit 83 is connected to a control input of switch 77, and a fifth control signal of circuit 83 is connected to a control input of switch 76.

Those skilled in the art will appreciate that any of switches 76-80 each may be a transistor or each may be two or more transistors connected together to function as a switch or alternately may be diodes. Although the storage element is illustrated as a capacitor 82 those skilled in the art will appreciate that the storage element may have other embodiments.

Figure 8:
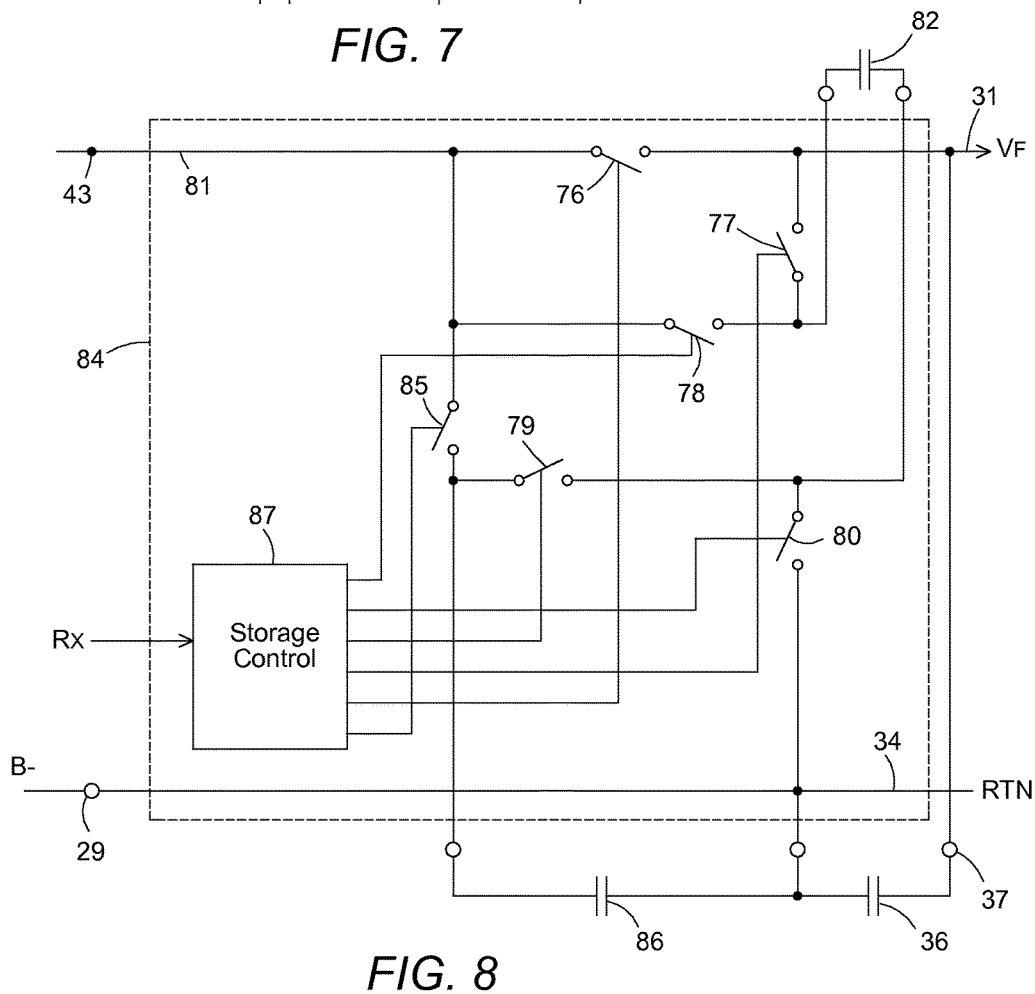
FIG. 8 schematically illustrates an example of another storage circuit that may be an alternate embodiment of the storage circuit of FIG. 6 in accordance with the present invention.

FIG. 8 schematically illustrates an example of an embodiment of a portion of a storage circuit 84 that is an alternate embodiment of circuit 75 described in the description of FIG. 6. Circuit 84 is substantially similar to circuit 75 except that circuit 84 includes an additional storage element (such as for example capacitor 86), an additional control switch 85 to control the additional storage element, and a storage control circuit 87 that includes an additional control signal to control switch 85.

Circuit 84 may be configured to charge the two storage elements from current 48 during an active portion of a signal and to transfer charge from one or more of the storage elements to output 31 after termination of the active portion of the signal. For example, switches 78, 80, and 85 may be enabled to charge capacitors 82 and 86 (with switches 76, 77, and 79 disabled) during an active portion of one signal received on bus 16. Switches 77 and 79 may be enabled (with switches 76, 78, 80, and 85 disabled) to transfer charge from capacitors 82 and 86 to output 31 after termination of the active portion. In another embodiment, a charge transfer may occur during an active portion of a subsequent signal. Another embodiment may include that circuit 84 may be configured to charge capacitor 82 during an active portion of one signal and to charge capacitor 86 during an active portion of another signal. Charge may be transferred from capacitor 82 to output 31 separately from capacitor 86 transferring charge to output 31 in another embodiment.

In another embodiment, the charge transfer sequence may be initiated in response to one or more of the voltage of capacitor 82 or the voltage of capacitor 86 reaching a threshold value such as described for the circuits of FIG. 7.

In an embodiment, a first terminal of switch 85 is connected to input 81 and a second terminal is commonly connected to a first of capacitor 86 and the first terminal of switch 79 (the first terminal of switch 79 is not connected to input 81). A second terminal of capacitor 36 is connected to return 34.

Those skilled in the art will appreciate that although two storage elements are explained in the description of circuit 84, more than two storage elements may be used to store change in response to an active portion of the input signal and to transfer charge from the storage elements(s) subsequently to the active portion of the signal.

Storing energy in response to the active portion of the received signal and subsequently transferring energy to output 31 increases the efficiency of a bus coupler that includes any of circuits 75 or 84. Any or both of circuits 75 or 84 may be included as a portion of any of couplers 25, 26, 61, or 90. In most embodiments, the storage elements of circuits 75 and 84 may be too large to be integrated onto a single semiconductor die along with the other circuits of couplers 25, 26, 61, or 90.

Figure 9:
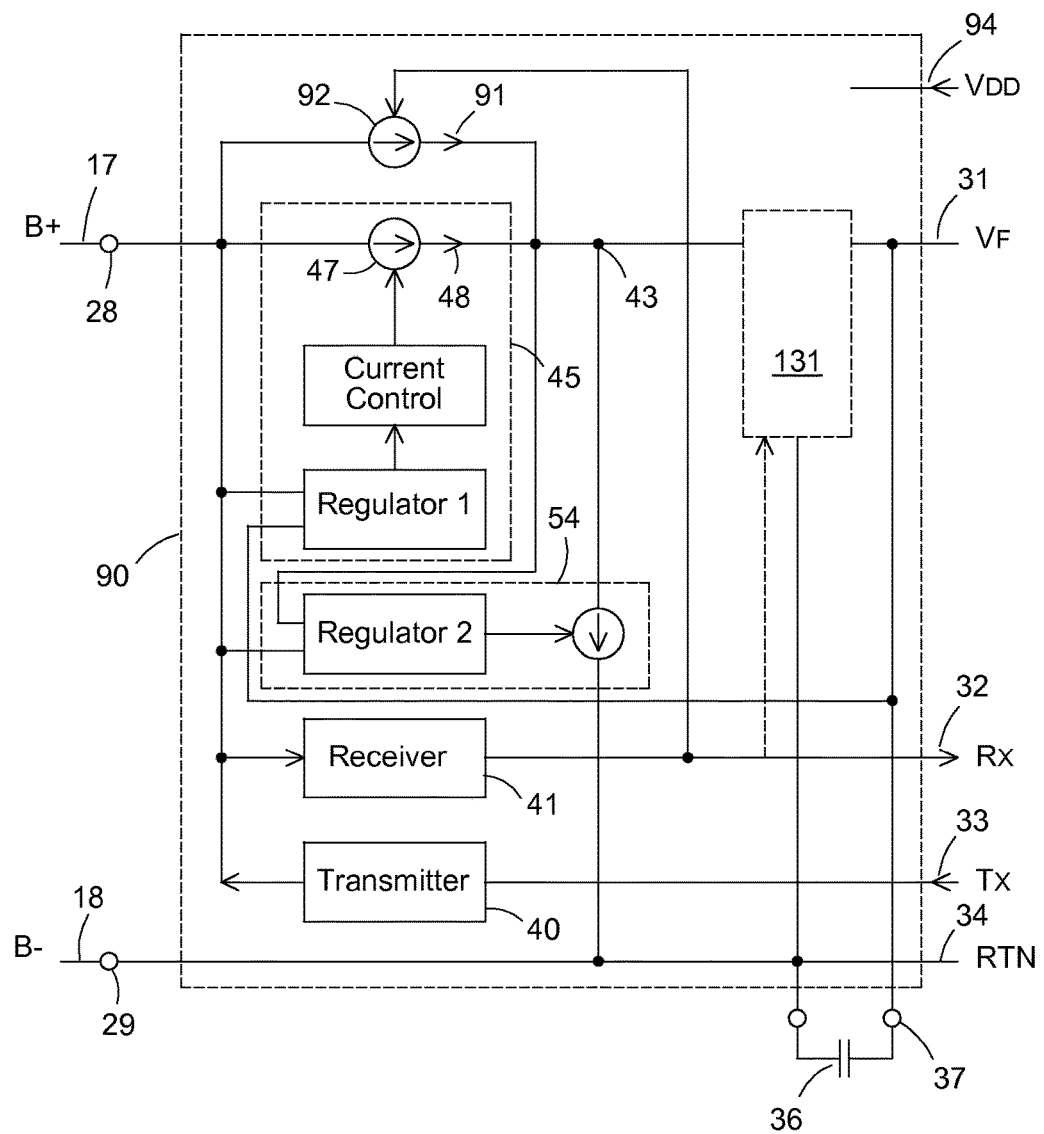
FIG. 9 schematically illustrates an example of an embodiment of a portion of another bus coupler that may be an alternate embodiment of the bus couplers of at least FIGS. 1, 3, and 5 in accordance with the present invention.

FIG. 9 schematically illustrates an example of an embodiment of a portion of a bus coupler 90 that is an alternate embodiment of any of couplers 25, 26, or 61. Coupler 90 is substantially the same as either of couplers 25, 26, or 61 but includes an impedance control circuit that is configured to control the input impedance of coupler 90 in response to receiving an active portion of the input signal. Coupler 90 may, in some embodiments, include a bypass circuit 131 that may be an alternate embodiment of optional bypass circuit 60 that was described in the description of FIG. 3. Circuit 131 is substantially similar to circuit 60 but circuit 131 may be configured to be disposed in series between node 43 and output 31. Some embodiments of circuit 131 may be configured to provide a current flow path between node 43 and RTN 34 in some embodiments. In other embodiments, circuit 131 may be replaced by circuit 60 or both may be omitted.

The impedance control circuit of coupler 90 is configured to form a variable current 91 and supply current 91 to output 31. An embodiment of the impedance control circuit may include a variable current source 92. Variable current source 92 may be configured to vary the value current 91 in response to receiving the active portion of an input signal on input 28. In an embodiment, the impedance control circuit is configured to receive the received signal (RX) and control the value of current 91 responsively to the received signal. In an embodiment, the impedance control circuit may be configured to detect variations of the bus voltage relative to a d.c. value of the bus voltage and varies the impedance that coupler 90 forms between inputs 28 and 29 in response to the change in the d.c. value of the bus voltage. In an embodiment, coupler 90 is configured so that current 91 does not flow to power supply 23 (FIG. 1) or alternately does not flow to the $V_{DD}$ voltage.

Referring back to FIG. 2, plot 137 illustrates the value of current 91 formed by the impedance control circuit. This description has references to FIG. 2 and FIG. 9. During steady-state operation with no signal received on input 28, the impedance control circuit forms current 91 to have a steady-state value as illustrated by plot 139 between T0 and T1. The steady state value may be zero or may have other values. An embodiment of the impedance control circuit is configured to form the steady state value current 91 to have a positive value that flow from input 28 to output 31. The impedance control circuit is configured to decrease the value of current 91 by a first amount or first value in response to receiving the active portion of the signal as illustrated by plot 137 at time T1. The impedance control circuit is configured to increase the value of current 91 by a second amount or second value in response to termination of the active portion of the signal as illustrated by plot 137 at time T2. The second amount by which the current 91 is increased may have an embodiment that is less than the first amount by which current 91 was decreased as illustrated by plot 137 at time T2. The impedance control circuit may have an embodiment that is configured to slowly increase the value of current 91 a third amount or third value until reaching substantially the steady-state value prior to termination of the period of the bit cell as illustrated by plot 137 after time T2 and prior to time T3. The impedance control circuit may be used as a portion of any of couplers 25, 26, or 61.

Figure 10:
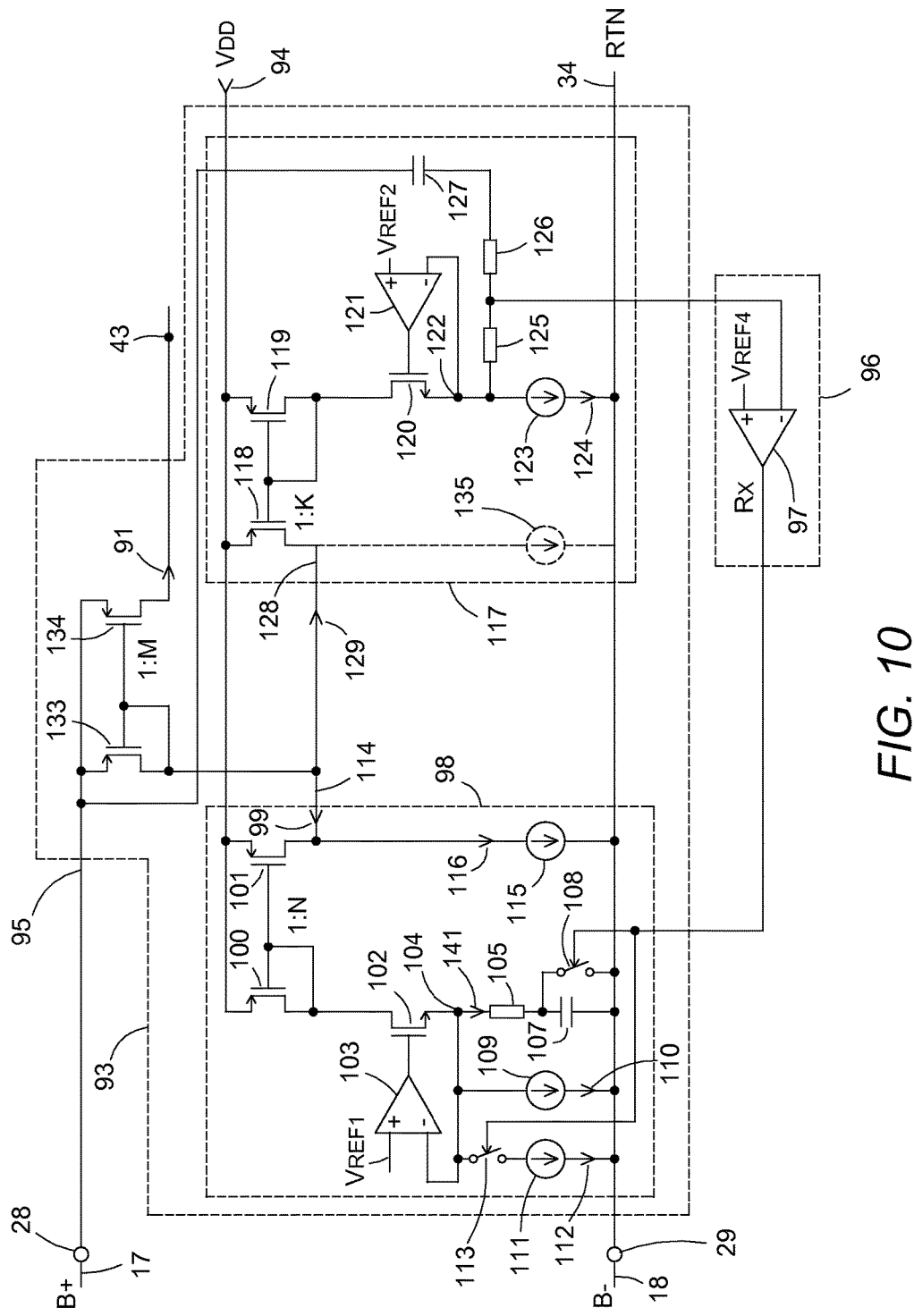
FIG. 10 schematically illustrates an example of an embodiment of a portion of an impedance control circuit that may be an alternate embodiment of an impedance control circuit of FIG. 9 in accordance with the present invention.

FIG. 10 schematically illustrates an example of an embodiment of a portion of an impedance control circuit 93 that may be an alternate embodiment of the impedance control circuit of FIG. 9. Circuit 93 includes a current control circuit 98 that forms a first portion of current 91 and a current control circuit 117 that forms a second portion of current 91. Circuit 98 is configured to form a current 99 that may represent the first portion of current 91 and circuit 117 is configured to form a current 129 that may represent the second portion of current 91.

Referring back to FIG. 2, plots 138 and 139 illustrate an example of values and waveforms of respective currents 99 and 129. This description has references to FIG. 2 and FIG. 10.

Circuit 93 has an input 95 configured to receive the signal from input 28 and has an output configured to provide current 91 to output 31. In an embodiment of circuit 93, the output may be connected to node 43. An embodiment of circuit 93 may have another input configured to receive the received signal (RX) from circuit 41. A receiver circuit 96 is illustrated in FIG. 10 that may be an alternate embodiment of receiver circuit 41.

Circuit 98 is configured to form current 99 to flow into an output 114 of circuit 98. Circuit 98 includes a resistor 105, a capacitor 107, a switch 108, current sources 109 and 115, and a current mirror having a current multiplier ratio of 1:N that includes transistors 100 and 101. A voltage regulator circuit of circuit 98 includes an amplifier 103, a transistor 102, and a reference voltage Vref1 from a voltage reference circuit. In some embodiments, circuit 98 may also include optional current source 111 and switch 113. Those skilled in the art will appreciate that in some embodiments, the RX signal may not directly affect the operation of circuit 93. For example a signal that is derived from the RX signal may be used. In a non-limiting example embodiment, a signal may be used that forms a pulse in response to an edge of the RX signal instead of using the RX signal directly.

During steady-state operation of circuit 98 (such as prior to time T1 in FIG. 2) the RX signal is negated and switches 108 and 113 are disabled or open. Amplifier 103 and transistor 102 form a voltage substantially equal to Vref1 at a node 104 which charges capacitor 107 to a voltage substantially equal to Vref1. Since switch 113 is disabled, the value of current 112 is substantially zero. In an embodiment, a current 110 flows from node 104 through current source 109 to the common reference voltage on return 34. An embodiment of current 99 may be equal to current 116 minus N times the value of the group that includes currents 141, 110 and optional current 112. Consequently, the value of current 99 is substantially constant. In an embodiment, the multiplier ratio 1:N steps up the value of the currents 110, 141 and optional current 112 to form the value current through transistor 101.

Referring now to circuit 117, circuit 117 is configured to form current 129 to flow into an output 128 of circuit 117. Circuit 117 includes a current mirror connected transistors 118 and 119 that form a multiplier ratio of 1:K. A voltage reference circuit of circuit 117 includes an amplifier 121, a transistor 120, and reference voltage Vref2. Circuit 117 also includes a current source 123, resistors 125 and 126, and a capacitor 127. As illustrated in FIG. 10, capacitor 127 is configured to receive the input signal from input 28 and capacitively couple receiver circuit 96 to input 28. In some embodiments, capacitor 127 and resistor 126 may be a portion of receiver circuit 96 or may be a portion of circuit 41 (FIG. 3) instead of a portion of circuit 96.

During the steady-state operation of circuit 117, amplifier 121 and transistor 120 form a voltage substantially equal to the value of Vref2 at a node 122. In an embodiment, current 124 flows from transistor 119 through transistor 120 to current source 123 and to return 34. Thus, current 129 is formed as current 124 divided by K. In an embodiment, the multiplier ratio 1:K steps down the value of current 124 to form current 129.

Transistors 133 and 134 form a current mirror having a current multiplier ratio of 1:M. Circuit 93 is configured to sum currents 129 and 99 together to flow through current mirror transistor 133 which results in current 91 having a value equal to the sum of currents 99 and 129 multiplied by the mirror ratio M. In an embodiment, the multiplier ratio 1:M steps up the summed value of currents 99 and 129 to form current 91.

In response to receiving the active portion of the signal, such as illustrated at time T1 in plots 137-139, circuit 117 decreases the value of current 129. In some embodiments, the voltage across capacitor 127 does not change instantaneously, thus, the active portion voltage will appear over resistors 125 and 126 and will cause an additional current through these resistors. This additional current, divided by ratio K, will cause current 129 to be lower than its steady state value as illustrated by plot 139 between times T1-T2. Under the assumption that the first order filter formed by capacitor 127 and resistors 125 and 126 has a time constant that is significantly larger than the duration of the active portion, the ratio between the active portion depth and the current change of current 129 is substantially constant in the active portion of the input signal. Referring now to circuit 98, in response to receiving the active portion of the signal, switches 108 and 113 become enabled or closed. Closing switch 113 enables current 112 to begin flowing. Closing switch 108 discharges capacitor 107 which results in a current 141 through resistor 105. The value of current 141 is stepped up by the Ration N of the current which reduces the value of current 99 as illustrated by plot 138 between times T1-T2. Thus, the summed values of currents 99 and 129 decrease which are mirrored to current 91 causing current 91 to decrease.

In one embodiment, in response to the active portion of the input signal, current 99 be formed to have a change in value. In an embodiment, circuit 98 may be formed to change the value of current 99 by a substantially constant value. An embodiment may include that current 129 may be formed to have a change in value, in response to the active portion of the input signal, that is proportional to the change in the value of the input signal. Another embodiment may include that current 129 may have a waveform that is an image of the input signal minus a d. c. value of the input signal.

In response to termination of the active portion of the signal at time T2, switches 108 and 113 of circuit 98 are disabled or opened. Opening switch 113 terminates current 112. Opening switch 108 causes current 141 to begin charging capacitor 107. Resistor 105 and capacitor 107 form a time constant that slowly increases the value of current 99 as illustrated by plot 138 after time T2. Referring to circuit 117, termination of the active portion of the signal increases the value of the voltage received on input 28. The increased value of the received signal increases the value of the voltage at node 122 and causes current to flow from capacitor 127 through resistors 126 and 125 into node 122. Consequently, the current in transistor 119 becomes smaller than the current 124. The current in transistor 119 is stepped down by the multiplier ratio 1:K to form current 129 with a larger value than before the end of the active portion as illustrated by plot 139 at time T3. For the embodiment in which the time constant of capacitor 127 and resistors 125 and 126 is large, there will be a voltage from capacitor 127 that results in a variation in current 129 which is reflected through ratios K and M to current 91. For example, current 129 may increase to a value that is greater than the steady-state value thereof. Depending on the ratios selected for K and M, current 99 may either increase or decrease. For the example embodiment, the ratios are chosen such that current 91 decreases to value less than the steady-state value thereof. Thereafter, current 91 may increase back to the steady-state condition as illustrated by plot 139 between times T2 to T3. An embodiment may include that the value of current 99 may be formed to have a change in value, in response to termination of the input signal, which initially increases and then decays to a value of current 9 prior to the active portion of the input signal. In an embodiment, current 129 may be formed to have a change in value, in response to termination of the input signal, which increases to a positive value and then decrease slowly to a substantially the steady-state value of current 129.

Those skilled in the art will understand that in some embodiments, either of or both of resistor 125 or capacitor 127 may be replaced by a conductor. Additionally, in some embodiments capacitor 127 may be replaced by a voltage source. In some embodiments, the value of Vref2 may be different from the value of Vref1, but the values may be the same in other embodiments. One skilled in the art would appreciate that the impedance control circuit and circuit 93 may be included as a portion of any of couplers 25, 26, and/or 61. In other embodiments, an optional current source 135 may be added to circuit 117. The value of current from source can be selected to adjust the steady-state value of current 129. For example, source 135 can facilitate forming current 129 to have a steady-state value that is substantially zero or alternately a positive value. Source 135 may be a discrete current source or alternately may be a portion of current 116 from source 115 of circuit 98.

In order to facilitate this functionality for circuit 93, a source of transistor 133 is commonly connected to input 28, a source of transistor 134, and a first terminal of capacitor 127. A drain of transistor 134 is connected to node 43. A drain of transistor 133 is commonly connected to a gate of transistor 133, a gate of one transistor 134, output 114, and output 128. Output 114 is commonly connected to a drain of transistor 101 and a first terminal of source 115. A second terminal of source 115 is connected to return 34. A source of transistor 101 is commonly connected to a source of transistor 101, a source of transistor 118, a source of transistor 119, and to $V_{DD}$ input 94. A drain of transistor 100 is commonly connected to a gate of transistor 100, a gate of transistor 101, and a drain of transistor 102. A source of transistor 102 is commonly connected to node 104, to a first terminal of resistor 105, to a first terminal of source 109, to a first terminal of switch 113, and to an inverting input of amplifier 103. A non-inverting input of amplifier 103 is connected to receive reference voltage Vref1. An output of amplifier 103 is connected to a gate of transistor 102. A second terminal of resistor 105 is commonly connected to a first terminal of capacitor 107 and a first terminal of switch 108. A second terminal of switch 108 is commonly connected to return 34 and to a second terminal of capacitor 107, a second terminal of source 109, and a first terminal of source 111. A second terminal of source 111 is connected to a second terminal of switch 113. Output 128 and circuit 117 is connected to a drain of transistor 118. A gate of transistor 118 is commonly connected to a gate of transistor 119, a drain of transistor 119, and a drain of transistor 120. A source of transistor 120 is commonly connected to node 122, a first terminal of source 123, a first terminal of resistor 125, and to an inverting input of amplifier 121. A non-inverting input of amplifier 121 is connected to receive the reference voltage Vref2. A second terminal of source 123 is connected to return 34. A second terminal of resistor 125 is commonly connected to a first terminal of resistor 126 and an inverting input of amplifier 97. In some embodiments, amplifier 97 may have hysteresis. Alternately, the reference circuit that forms reference voltage Vref4 could have a selectable value that changes responsively to the output of comparator 97. Resistor 126 has a second terminal connected to a second terminal of capacitor 127.

Changing the value of current 91 in response to receiving the active portion of the signal controls the value of the input impedance of the bus coupler and minimizes the load placed on the bus. An advantage of the embodiment in which impedance control circuit 93 functions as a controlled current source between input 28 and the output voltage VF is that the steady state value of current 91 is still delivered to output 31 and hence it does not degrade the energy efficiency of the bus coupler. Also when there is activity on the bus, current 91 will have the same current path as current 48 and hence will have the same energy efficiency as the current 48. Secondly, with the implementation of FIG. 10, an additional advantage is that the required components to fulfill the pulse impedance requirements of the KNX bus can easily be integrated on one semiconductor die, with the sole exception of capacitor 127. This capacitor however may in some embodiments be shared with the receiver circuit, such as for example circuit 96. If the purpose of capacitor 127 is for pulse impedance block, it could be replaced by a conductor.

Figure 11:
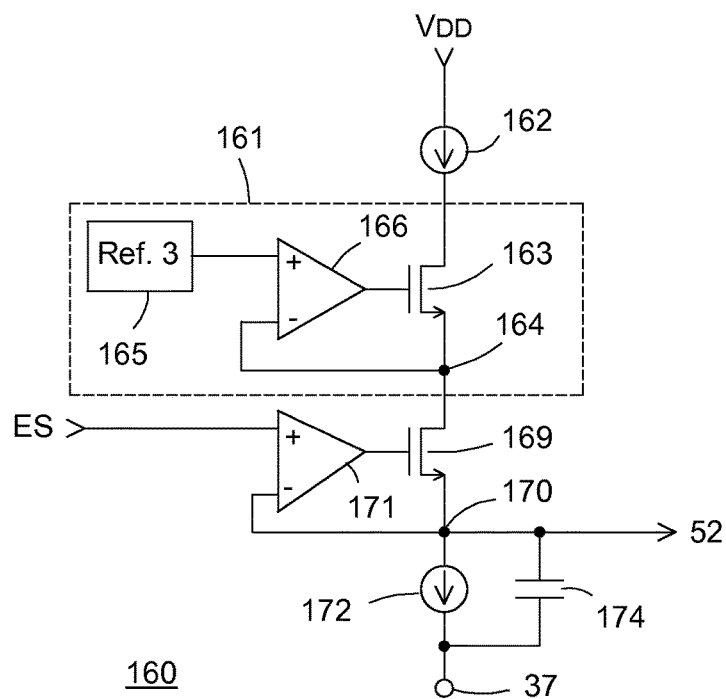
FIG. 11 schematically illustrates an example of an embodiment of a portion of a current limit circuit that is an alternate embodiment of a circuit of either of FIGS. 3 and 5 in accordance with the present invention.

FIG. 11 schematically illustrates an example of an embodiment of a portion of a current limit circuit 160 that is an alternate embodiment of circuit 51 that was described in the description of FIGS. 3 and 5. Circuit 160 is similar to and operates similarly to circuit 51 except that circuit 160 illustrates one example of a more detailed embodiment that may be used as an alternate for circuit 51. Circuit 160 includes a current source 162, a current source 172, a capacitor 174, and a voltage regulator circuit that includes an amplifier 171 and a transistor 169. Circuit may, in some embodiments, include an optional limit circuit 161. Circuit 161 may include an amplifier 166, a transistor 163, and a voltage reference circuit or Ref3 or Ref3 circuit 165.

The voltage reference circuit is configured to receive the error signal (ES) from either regulator 49 (FIG. 3) or from amplifier 64 (FIG. 5) and form a voltage at a node 170 that is representative of the error signal (ES). In an embodiment, the value of current from source 162 is greater than the current from source 172. An embodiment may include that the current from source 162 is approximately twice the value of current from source 172. If the value of the error signal (ES) increases or alternately decreases, the voltage on capacitor 172 is also increased or alternately decreased, respectively, at a rate according to the value of current from source 172. Thus, circuit 160 controls the rate of change of the error signal (ES) according to the value of capacitor 174 and the current from source 172. Capacitor may be external to circuit 160 in some embodiments, thus, external to a semiconductor die on which circuit 160 may be formed.

For the alternate embodiment that includes optional circuit 161, circuit 161 forms a voltage at a node 164 that is representative of the value of the voltage from circuit 165. Circuit 161 is configured to limit the maximum value of signal 52 to a value determined by the value of circuit 165. In an embodiment, the maximum value of signal 52 is limited to the value of the voltage at node 164.

Figure 12:
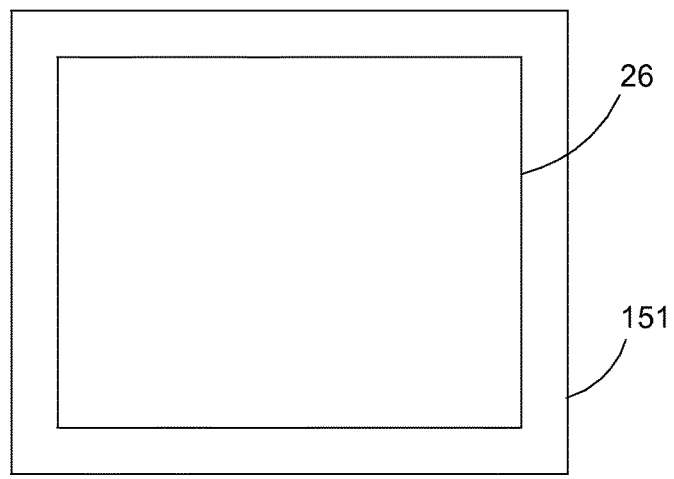
FIG. 12 illustrates an enlarged plan view of a semiconductor device that includes at least one of the bus couplers of FIGS. 1, 3, 5, and 9 in accordance with the present invention.

FIG. 12 illustrates an enlarged plan view of a portion of an embodiment of a semiconductor device or integrated circuit 150 that is formed on a semiconductor die 151. In an embodiment, any one of couplers 25, 26, 61, and/or 90 may be formed on die 151. Die 151 may also include other circuits that are not shown in FIG. 12 for simplicity of the drawing. The coupler and device or integrated circuit 150 may be formed on die 151 by semiconductor manufacturing techniques that are well known to those skilled in the art.

Figure 13:
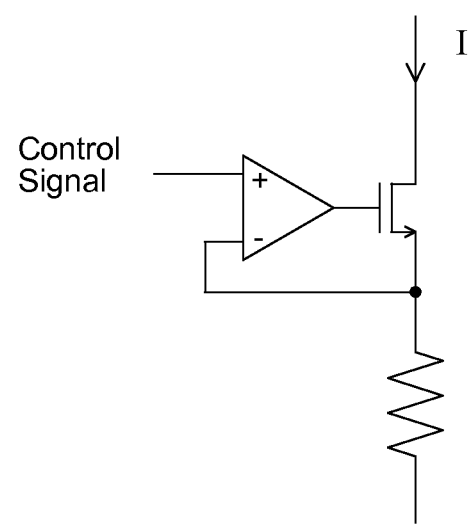
FIG. 13 schematically illustrates an example of an embodiment of a portion of an adjustable current source in accordance with the present invention.

FIG. 13 schematically illustrates an example of an embodiment of a portion of an adjustable current source 177. In some embodiments, source 177 may be used for one are more of sources 47, 56, or 92. Sources 47, 56, or 92 may have other configurations in other embodiments. Those skilled in the art will appreciate that the value of current I changes proportionally to changes in the value of the control signal.

From all the foregoing, one skilled in the art can understand that an embodiment of a bus coupler may comprise:

a first input, such as input 28 in a non-limiting example embodiment, configured for coupling to a first line of a bus;

a second input, such as input 29 in a non-limiting example embodiment, configured for coupling to a second line of the bus wherein the bus coupler is configured to receive an input signal from the bus on the first input;

an output, such as output 31 in a non-limiting example embodiment, configured to have an output voltage of the bus coupler formed at the output;

a first voltage control circuit, such as circuit 45 in a non-limiting example embodiment, having a first current source, such as source 47 in a non-limiting example embodiment, coupled to receive the input signal, the first current source configured to form a first current and couple the first current to the output, the first voltage control circuit configured to control a value of the first current to regulate the output voltage to a first value;

a second voltage control circuit, such as circuit 54 in a non-limiting example embodiment, configured to selectively conduct a second current, such as current 57 in a non-limiting example embodiment, from the first current source away from the output to regulate a voltage drop across the first current source to a second value.

In an embodiment, the second current may be a portion of the first current.

From all the foregoing, one skilled in the art will understand that an embodiment of a bus coupler may comprise:

a first input, such as for example input 28, configured for coupling to a first line of a bus;

a second input, such as for example input 29, configured for coupling to a second line of the bus wherein the bus coupler is configured to receive an input signal from the bus on the first input;

an output, such as for example output 31, configured to have an output voltage of the bus coupler formed at the output;

a first voltage control circuit, such as for example circuit 45, having a first current source, such as for example source 47, coupled to receive the input signal, the first current source configured to form a first current and couple the first current to the output, the first voltage control circuit configured to control a value of the first current to regulate the output voltage to a first value; and a second voltage control circuit configured to selectively conduct a second current, such as for example current 57, from the first current source away from the output to regulate a voltage drop across the first current source to a second value.

An embodiment of the bus coupler may include a second current source, such as for example source 56, configured to selectively conduct the second current from the first current source away from the output of the bus coupler.

In an embodiment, the second current source may be coupled between an output of the first current source and the second input.

In another embodiment, the second voltage control circuit may be configured to selectively control a value of the second current according to a value of the first current.

An embodiment may include that the second voltage control circuit may be configured to selectively control a value of the second current according to a value of the voltage drop across the first current source.

In an embodiment, the second voltage control circuit may include a first amplifier, such as for example amplifier 68 68, having a first input configured to receive a value of the input signal from the bus, a second input configured to receive a control signal, such as for example signal 52, that is representative of a value of the first current, and an output coupled to control a value of the second current.

In another embodiment, a second current source, such as for example source 90, may be coupled in parallel to the first current source, the second current source may be configured to selectively form a third current, such as for example current 91, having a third value, and couple the third current to the output, wherein the second current source may be configured to selectively decrease the third current in response to an active portion of the input signal and to selectively increase the third current in response to termination of the active portion of the input signal.

Those skilled in the art will appreciate from all the foregoing that a method of forming a bus coupler may comprise:

forming the bus coupler to form a first current, such as for example current 47, to flow from a first input, such as for example input 28, of the bus coupler to an output, such as for example output 31, of the bus coupler;

configuring a first circuit to control a value of the first current in response to a difference between a voltage at the first input and a voltage at the output; and configuring a second circuit to control a voltage drop across a portion of the first circuit, such as a non-limiting example of the voltage across source 47, to no less than a threshold value of the first circuit.

An embodiment of the method may include coupling a first current source to the first input to supply the first current to the output, and configuring the second circuit to conduct a portion of the first current away from the output as a second current and to control a value of the second current according to a voltage drop across the first current source.

Another embodiment may include forming the first circuit to include a first current source coupled to the first input to supply the first current to the output, and configuring the second circuit to conduct a portion of the first current away from the output as a second current and to control a value of the second current according to a value of the first current.

An embodiment may include forming the first circuit to include a first current source coupled to the input to supply the first current to the output, and configuring the second circuit to conduct a portion of the first current away from the output as a second current and to control a value of a voltage drop across the first current source to no less than a threshold value of the first current source.

Those skilled in the art will appreciate that a method of forming a bus coupler may comprise:

configuring the bus coupler to receive input signals on a first input, such as for example input 28, of the bus coupler;

forming the bus coupler to form a first current, such as for example current 47, to flow from the first input to an output, such as for example output 31, of the bus coupler;

configuring a first circuit to control a value of the first current in response to a difference between a voltage at the first input and a voltage at the output; and configuring a second circuit, such as for example circuit 75, to store energy from the first current in a first storage element in response to an active portion of a first input signal of the input signals, and to transfer energy from the first storage element to the output after termination of the active portion of the first input signal.

Another embodiment may include configuring the second circuit to transfer energy from the first storage element to the output in response to an active portion of a second input signal of the input signals, such as for a non-limiting example of a next logic zero signal, wherein the second input signal is subsequent to the first input signal.

In an embodiment, the method may include, configuring the second circuit to transfer energy from the first storage element to the output in response to a difference between a value of the output and a value stored by the first storage element.

An embodiment may include configuring the second circuit to store energy from the first current in the first storage element, such as for example 82, and in a second storage element, such as for example 86/FIG. 7, in response to receiving the active portion of the first input signal.

Those skilled in the art will understand that an embodiment of a bus coupler may comprise:

a first input of the bus coupler configured to receive input signals;

a first circuit configured to form a first current to flow from the first input to an output of the bus coupler;

a first control circuit configured to control a value of the first current in response to regulate an output voltage on the output;

a first plurality of switches, such as for example switches 78 and 80, configured to couple a first capacitor to receive the first current and charge the first capacitor responsively to an active portion of a first input signal of the input signals; and a second plurality of switches, such as for example switches 77 and 79, configured to transfer energy from the first capacitor to the output after termination of the active portion of the first input signal.

Another embodiment may include a second capacitor and a third plurality of switches configured to couple the second capacitor, such as for example 86/FIG. 7, to receive the first current and charge the second capacitor responsively to one of receiving the active portion of the first input signal or an active portion of a second input signal of the input signals.

An embodiment may include a second control circuit configured to transfer energy from the first capacitor to the output in response to a difference between a value of the output and a value of the first capacitor.

In an embodiment, the bus coupler may include the first and second plurality of switches configured to couple the first and second capacitors to transfer energy from the first and second capacitors to the output after termination of the active portion of the first input signal.

Those skilled in the art will appreciate that a method of forming a bus coupler may comprise:

configuring the bus coupler to receive an input signal on a first input, such as for example input 28, of the bus coupler;

forming a first circuit, such as for example circuit 45, to form a first current, such as for example current 48, to flow from the first input to an output, such as for example output 31, of the bus coupler to regulate an output voltage at the output;

coupling a second circuit, such as for example circuit 92 or alternately 93, to receive the input signal, and configuring the second circuit to form a first value, such as for example a steady state value, of a second current, such as for example current 91, to flow to the output; and configuring the second circuit to selectively decrease the second current to a second value in response to an active portion of the input signal, and configuring the second circuit to selectively increase the second current to a third value in response to termination of the active portion of the input signal wherein the third value subsequently decreases toward the first value.

An embodiment may include configuring the second circuit includes configuring the second circuit to form the second current to flow to the output but not to the first input.

Another embodiment may include configuring the second circuit to form a third current, such as for example current 129, that is representative of a voltage waveform of the input signal minus a d. c. component of a voltage of the input signal in response to the active portion of the input signal and to increase a value of the third current in response to termination of the active portion of the input signal wherein the third current subsequently decreases to substantially a steady-state value.

An embodiment may include configuring the second circuit to form a fourth current, such as for example current 99, having the first value prior to the active portion of the input signal, having a fourth value in response to the active portion of the input signal wherein the fourth value is less than the first value and is proportional to a change in the input signal, and having a fifth value that increases to greater than the fourth value in response to termination of the active portion of the input signal and subsequently changes to the substantially the first value; and configuring the second circuit to sum the third and fourth currents and to use the sum to form the second current.

In an embodiment, the method may include configuring a third circuit, such as for example circuit 117, to configure a first voltage regulator circuit to form a first voltage at a first node; coupling a voltage source to the first node; and coupling a voltage source between the first node and the first input wherein the voltage source causes a decrease of a voltage at the first node in response to the active portion of the input signal.

Another embodiment of the method may include configuring the third circuit includes configuring the third circuit to increase the voltage at the first node in response to termination of the active portion of the input signal wherein the increase in the voltage at the first node is representative of an increase in a value of the third current in response to termination of the active portion of the input signal.

An embodiment may include configuring a fourth circuit, such as for example circuit 93, to include a voltage regulator circuit to form a second voltage at a second node, and coupling a resistor to the second node to form a fifth current through the first resistor;

coupling a first capacitor to receive the fifth current and coupling a first switch in parallel to the capacitor; and configuring the fourth circuit to selectively enable the first switch to short across the capacitor in response to the active portion of the input signal and to selectively remove the short from across the first capacitor in response to termination of the active portion of the input signal.

Another embodiment of the method may include coupling a first current source to receive the input signal and form an output voltage on the output.

An embodiment may include configuring the first circuit to include a first current source configured to receive the input signal and form an output voltage on the output, and configuring a third circuit, such as for example circuit 67, to selectively conduct a third current from the first current source away from the output to regulate a voltage drop across the first circuit to a second value.

In an embodiment, the method may include configuring the second circuit to form the third value to decrease to subsequently the first value An embodiment may include configuring the second circuit to form the first value, the second value, and the third value during a bit cell time interval of the input signal.

Those skilled in the art will appreciate that a bus coupler may comprise:

a first circuit configured to form a first current, such as for example current 47, to flow from a first input, such as for example input 28, of the bus coupler to an output, such as for example output 31, of the bus coupler;

a first control circuit, such as for example circuit 45, configured to control a first value of the first current to regulate an output voltage on the output; and a second circuit, such as for example circuit 92 or alternately 93, configured to form a second current, such as for example current 91, to flow from the first input to the output wherein the second current does not flow to the first input, the second circuit configured to form the second current to have a second value that is substantially constant prior to an active portion of an input signal receive at the first input, configured to form the second current to have a third value that is less than the second value in response to the active portion of the input signal, and configured to increase the third value to a fourth value in response to termination of the active portion of the input signal wherein the fourth value is less than the second value and subsequently increases to substantially the second value.

Another embodiment may include a third circuit, such as for example circuit 98, including;

a second input;

a first current mirror coupled to the second input;

a first current source coupled to a first leg of the first current mirror;

a first voltage regulator configured to form a first voltage at a first node, the first voltage regulator coupled to a second leg of the first current mirror;

a first resistor coupled to an output of the first voltage regulator; and a first capacitor coupled to the first resistor;

a first switch coupled in parallel to the first capacitor, the first switch configured to be selectively enabled in response to the active portion of the input signal;

a second current source coupled to the first node and coupled in parallel to the first resistor and first capacitor.

An embodiment may include a third circuit, such as for example circuit 117, wherein the third circuit includes;

a third input;

a second current mirror having a first leg coupled to the third input, the second current mirror having a second leg;

a second voltage regulator configured to form a second voltage at a second node, the second voltage regulator coupled to the second leg of the second current mirror;

a second current source coupled to the second node;

a second resistor coupled to the second node; and a voltage source coupled in series with the second resistor wherein the voltage source may be coupled to receive a signal that is representative of the input signal.

In view of all of the above, it is evident that a novel device and method is disclosed. Included, among other features, is forming a bus coupler to regulate a voltage on a current forming element to a first value. Regulating the voltage on the current forming element facilitates more accurately control the power consumed by the bus coupler from the bus. Another embodiment of a bus coupler may include storing energy from the bus during an active portion of the signal on the bus. Storing the energy and releasing at least a portion of the stored energy to an output of the coupler reduces the power consumed from the bus and increases the efficiency of the coupler. In another embodiment, a bus coupler may include an impedance control circuit that regulates a value of an impedance that the coupler presents to the bus. Regulating the impedance minimizes dampening of active and equalization pulses on the bus. Also, regulating the impedance may in some embodiments reduce external components that were previously connected to bus couplers thereby reducing the cost of the bus coupler that includes the impedance control circuit.

While the subject matter of the descriptions are described with specific preferred embodiments and example embodiments, the foregoing drawings and descriptions thereof depict only typical and non-limiting examples of embodiments of the subject matter and are not therefore to be considered to be limiting of its scope, it is evident that many alternatives and variations will be apparent to those skilled in the art. As will be appreciated by those skilled in the art, the example form of couplers 25, 26, 61, and 90 are used as a vehicle to explain the operation method of forming and operating bus couplers. Although the subject matter of the embodiments are described using non-limiting example embodiments, the subject matter is not limited to the described examples. Although the description may indicate that an action occurs in response to receiving the RX signal, the action may be initiated in response to receiving a signal that is derived from the RX signal or a signal that is representative of the input signal. Additionally, the action may be initiated in response to the active portion of the signal received on input 28 instead of a particular circuit receiving the RX signal or a signal that is representative thereof.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A bus coupler comprising:
a first input configured for coupling to a first line of a bus;
a second input configured for coupling to a second line of the bus wherein the bus coupler is configured to receive an input signal from the bus on the first input;
an output configured to have an output voltage of the bus coupler formed at the output;
a first voltage control circuit having a first current source coupled to receive the input signal, the first current source configured to form a first current and couple the first current to the output, the first voltage control circuit configured to control a value of the first current to regulate the output voltage to a first value and configured to vary a value of the first current in response to a difference between a voltage at the first input and the output voltage; and
a second voltage control circuit configured to selectively conduct a second current from the first current source away from the output to regulate a voltage drop across the first current source to a second value.

2. The bus coupler of claim 1 wherein the second voltage control circuit includes a second current source configured to selectively conduct the second current from the first current source away from the output of the bus coupler in response to a difference between the first current and the voltage at the first input.

3. The bus coupler of claim 2 wherein the second current source is coupled between an output of the first current source and the second input.

4. The bus coupler of claim 1 wherein the second voltage control circuit is configured to selectively control a value of the second current according to a value of the first current.

5. The bus coupler of claim 1 wherein the second voltage control circuit is configured to selectively control a value of the second current according to a value of the voltage drop across the first current source.

6. The bus coupler of claim 1 wherein the second voltage control circuit includes a first amplifier having a first input configured to receive a value of the input signal from the bus, a second input configured to receive a control signal that is representative of a value of the first current, and an output coupled to control a value of the second current.

7. A bus coupler comprising:
a first input configured for coupling to a first line of a bus;
a second input configured for coupling to a second line of the bus wherein the bus coupler is configured to receive an input signal from the bus on the first input;
an output configured to have an output voltage of the bus coupler formed at the output;
a first voltage control circuit having a first current source coupled to receive the input signal, the first current source configured to form a first current and couple the first current to the output, the first voltage control circuit configured to control a value of the first current to regulate the output voltage to a first value;
a second voltage control circuit configured to selectively conduct a second current from the first current source away from the output to regulate a voltage drop across the first current source to a second value; and
a second current source coupled in parallel to the first current source, the second current source configured to selectively form a third current having a third value, and couple the third current to the output, the second current source configured to selectively decrease the third current in response to an active portion of the input signal and to selectively increase the third current in response to termination of the active portion of the input signal.

8. A method of forming a bus coupler comprising:
configuring the bus coupler to receive input signals on a first input of the bus coupler;
forming the bus coupler to form a first current to flow from the first input to an output of the bus coupler;
configuring a first circuit to control a value of the first current in response to a difference between a voltage at the first input and a voltage at the output; and
configuring a second circuit to store energy from the first current in a first storage element in response to an active portion of a first input signal of the input signals, and to transfer energy from the first storage element to the output after termination of the active portion of the first input signal.

9. The method of claim 8 including configuring the second circuit to transfer energy from the first storage element to the output in response to an active portion of a second input signal of the input signals wherein the second input signal is subsequent to the first input signal.

10. The method of claim 8 including configuring the second circuit to transfer energy from the first storage element to the output in response to a difference between a value of the output and a value stored by the first storage element.

11. The method of claim 8 including configuring the second circuit to store energy from the first current in the first storage element and in a second storage element in response to receiving the active portion of the first input signal.

12. A method of forming a bus coupler comprising:
configuring the bus coupler to receive an input signal on a first input of the bus coupler;
forming a first circuit to form a first current to flow from the first input to an output of the bus coupler to regulate an output voltage at the output;
coupling a second circuit to receive the input signal, and configuring the second circuit to form a first value of a second current to flow to the output; and
configuring the second circuit to selectively decrease the second current to a second value in response to an active portion of the input signal, and configuring the second circuit to selectively increase the second current to a third value in response to termination of the active portion of the input signal wherein the third value subsequently decreases toward the first value.

13. The method of claim 12 wherein configuring the second circuit includes configuring the second circuit to form the second current to flow to the output but not to the first input.

14. The method of claim 12 wherein configuring the second circuit includes configuring the second circuit to form a third current that is representative of a voltage waveform of the input signal minus a d. c. component of a voltage of the input signal in response to the active portion of the input signal and to increase a value of the third current in response to termination of the active portion of the input signal wherein the third current subsequently decreases to substantially a steady-state value.

15. The method of claim 14 wherein configuring the second circuit includes configuring the second circuit to form a fourth current having the first value prior to the active portion of the input signal, having a fourth value in response to the active portion of the input signal wherein the fourth value is less than the first value and is proportional to a change in the input signal, and having a fifth value that increases to greater than the fourth value in response to termination of the active portion of the input signal and subsequently changes to the first value; and
configuring the second circuit to sum the third and fourth currents and to use the sum to form the second current.

16. The method of claim 15 wherein configuring the second circuit includes configuring a third circuit to configure a first voltage regulator circuit to form a first voltage at a first node; coupling a voltage source to the first node; and
coupling a voltage source between the first node and the first input wherein the voltage source causes a decrease of a voltage at the first node in response to the active portion of the input signal.

17. The method of claim 16 wherein configuring the third circuit includes configuring the third circuit to increase the voltage at the first node in response to termination of the active portion of the input signal wherein the increase in the voltage at the first node is representative of an increase in a value of the third current in response to termination of the active portion of the input signal.

18. The method of claim 17 wherein configuring the second circuit includes configuring a fourth circuit to include a voltage regulator circuit to form a second voltage at a second node, and coupling a resistor to the second node to form a fifth current through the first resistor;
coupling a first capacitor to receive the fifth current and coupling a first switch in parallel to the capacitor; and
configuring the fourth circuit to selectively enable the first switch to short across the capacitor in response to the active portion of the input signal and to selectively remove the short from across the first capacitor in response to termination of the active portion of the input signal.

19. The method of claim 18 wherein configuring the first circuit includes coupling a first current source to receive the input signal and form an output voltage on the output.

20. The method of claim 12 further including configuring the first circuit to include a first current source configured to receive the input signal and form an output voltage on the output, and configuring a third circuit to selectively conduct a third current from the first current source away from the output to regulate a voltage drop across the first circuit to a second value.

* * * * *